(12) United States Patent
Finn, Jr.

(10) Patent No.: US 11,718,009 B2
(45) Date of Patent: Aug. 8, 2023

(54) CONCENTRICITY ADJUSTMENT SLEEVE

(71) Applicant: Guill Tool & Engineering Co., Inc., West Warwick, RI (US)

(72) Inventor: Denis Thomas Finn, Jr., Wrentham, MA (US)

(73) Assignee: Guill Tool & Engineering Co., Inc.

( * ) Notice: Subject to any disclaimer, the term of this patent is extended or adjusted under 35 U.S.C. 154(b) by 0 days.

(21) Appl. No.: 17/889,745

(22) Filed: Aug. 17, 2022

(65) Prior Publication Data
US 2022/0388218 A1    Dec. 8, 2022

Related U.S. Application Data

(63) Continuation of application No. 15/710,885, filed on Sep. 21, 2017, now Pat. No. 11,420,374.

(60) Provisional application No. 62/397,517, filed on Sep. 21, 2016.

(51) Int. Cl.
| | |
|---|---|
| *B29C 48/09* | (2019.01) |
| *B29C 48/325* | (2019.01) |
| *B29C 48/12* | (2019.01) |
| *B29C 48/30* | (2019.01) |
| *B29C 48/10* | (2019.01) |

(52) U.S. Cl.
CPC .............. *B29C 48/09* (2019.02); *B29C 48/12* (2019.02); *B29C 48/302* (2019.02); *B29C 48/325* (2019.02); *B29C 48/327* (2019.02); *B29C 48/10* (2019.02)

(58) Field of Classification Search
None
See application file for complete search history.

(56) References Cited

U.S. PATENT DOCUMENTS 5,120,212 A *   6/1992   Reiber ................... B29C 48/09
                                                            425/141
8,235,701 B2 *  8/2012   Langlais ............... B29C 48/327
                                                            425/192

* cited by examiner

*Primary Examiner* — Jacob T Minskey
*Assistant Examiner* — Adrien J Bernard
(74) *Attorney, Agent, or Firm* — Ziegler IP Law Group LLC

(57) ABSTRACT

A method and device for adjusting the concentricity of a die component of an extrusion assembly relative to a tip component in a manner that minimizes time and effort. The concentricity adjusting extrusion device includes an extrusion die body assembly including a die subassembly and a body, a die tip module and an adjustment sleeve subassembly; wherein said adjustment sleeve subassembly adjusts the concentricity of the die subassembly relative to the die tip module.

12 Claims, 3 Drawing Sheets

CONCENTRICITY ADJUSTMENT SLEEVE

CROSS-REFERENCE TO RELATED APPLICATIONS

This application is a continuation of U.S. Non-provisional application Ser. No. 15/710,885 filed Sep. 21, 2017 and granted as U.S. Pat. No. 11,420,374, which claims priority to and the benefit of U.S. Provisional Patent Application Ser. No. 62/397,517 filed Sep. 21, 2016, the disclosure of which is incorporated herein by reference in its entirety.

FIELD

The present disclosure generally relates to extrusion die systems. In particular, the present disclosure relates to a specialty adjustment mechanism designed for the ease of adjustment of concentricity of extrusion dies.

BACKGROUND

Extrusion is the pressurized processing of molten material through a die to form the material into a specific shape. Extrusion dies can range from the very simple designs such as a hole through a piece of metal to complex assemblies involving multiple components including deflectors which help to form the plastic into the desired shape. Extrusion is often used to create products which are tubes or tubular shaped. In these products it is often critical that the wall thickness of the tube is uniform or set to a certain tolerance. The extrusion die head often needs to be adjusted to create this desired or uniform thickness as there are many factors which can result in variation. Such factors include gravity, flow balance issues due to design, material or processing conditions or even machining tolerances. The process to make the necessary adjustments needs to be quick and intuitive to maximize productivity. Many current designs to perform the necessary adjustments involve using multiple stationary bolts to push the die components relative to the tip component. This approach can be time consuming as adjustments will require that multiple bolts are turned and if material needs to be increased or decreased in an area that is not directly in line with the bolts, the process can be complex and unintuitive.

SUMMARY

The present invention provides a method and device for adjusting the concentricity of a die component of an extrusion assembly relative to a tip component in a manner that minimizes time and effort. The concentricity adjusting extrusion device comprises an extrusion die body assembly including a die subassembly and a body, a die tip module and an adjustment sleeve subassembly; wherein said adjustment sleeve subassembly adjusts the concentricity of the die subassembly relative to the die tip module. The concentricity adjustment sleeve works such that it can be rotated to a certain angle/position that needs adjustment and a single (or optionally more than one) bolt can be turned to perform the adjustment. The adjustment sleeve can be designed to integrate different means of adjustment such as a bolt which pushes the die holder and/or die in a direction or a mechanism which pulls the die components towards it. The adjustment can also be made to be performed automatically through motors which would operate the adjustment sleeve and optionally the use of sensors to measure the concentricity of an extrudate.

An aspect of the invention of a concentricity adjusting extrusion device comprises an extrusion die body assembly including a die subassembly and a body, a die tip module and an adjustment sleeve subassembly; wherein said adjustment sleeve subassembly adjusts the concentricity of the die subassembly relative to the die tip module.

Another aspect of the concentricity adjusting extrusion device is wherein said die body assembly includes a die subassembly comprising a least a die but may additionally include a die holder and one or more die nuts as well as other components known in the art.

Another aspect of the concentricity adjusting extrusion device is wherein said tip module is a solid module (including cylindrical, square, profile etc.) positioned in an axial bore cavity formed by the extrusion die subassembly forming a gap between the axial surface of the extrusion die subassembly and the tip module through which an extrusion flow exits the device.

Another aspect of the concentricity adjusting extrusion device is wherein said adjustment sleeve subassembly comprises a concentrical shouldered sleeve with one or more adjustment means that is placed over the extrusion die subassembly; wherein said adjustment sleeve subassembly maintains concentricity of the die subassembly, said adjustment sleeve subassembly may rotate around the die subassembly when the one or more adjustment means are loosened, and said adjustment sleeve subassembly may adjust the concentricity of the die subassembly relative to the die tip module by single point force adjustment.

Another aspect of the concentricity adjusting extrusion device is wherein said extrusion gap is an annular exit channel or a profile exit channel.

Another aspect of the concentricity adjusting extrusion device is wherein said adjustment means is a bolt. Examples of certain concentricity adjusting extrusion means including bolts can be adapted from those described in U.S. Pat. No. 8,235,701, issued Aug. 7, 2012.

The present invention also relates to a method of adjusting the concentricity of a walled product extruded at a gap exit channel formed by alignment of surfaces from an extrusion die subassembly and tip module by adjusting the orientation of an extrusion die subassembly relative to a central axial tip.

Another aspect of the method of adjusting the concentricity of a walled product is wherein said extrusion die subassembly includes a die and additionally may include a die holder and one or more die nuts or die caps circumferentially joined to form an axial bore.

Another aspect of the method of adjusting the concentricity of a walled product is wherein said tip module is a solid module (including cylindrical, square, profile) positioned in the axial bore forming a gap with the extrusion die subassembly and includes a central axial tip.

Another aspect of the method of adjusting the concentricity of a walled product is wherein said adjustment sleeve subassembly comprises a concentrical shouldered sleeve with one or more adjustment means that is placed over the extrusion die subassembly. The adjustment sleeve subassembly maintains concentricity of the die subassembly, and said adjustment sleeve subassembly may rotate around the die subassembly when the one or more adjustment means are loosened. Additionally, said rotating and tightening the adjustment sleeve subassembly adjusts the concentricity of the die subassembly relative to the die body assembly and the die extrusion tip gap.

Another aspect of the method of adjusting the concentricity of a tubular walled product where the extrusion gap is an annular exit channel or a profile exit channel.

Another aspect of the method of adjusting the concentricity of a tubular walled product is wherein said adjustment means is a bolt.

Another aspect of the method of adjusting the concentricity of a tubular walled product is wherein said adjustment sleeve subassembly is rotated by a motor.

Another aspect of the method of adjusting the concentricity of a tubular walled product is wherein said one or more adjustment means is actuated by a motor.

Another aspect of the method of adjusting the concentricity of a tubular walled product is wherein said method includes operation of motors is controlled by feedback of the results of testing the concentricity of the extruded product.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred aspects of the present disclosure, and together with the general description given above and the detailed description given below, serve to explain the principles of the present disclosure. As shown throughout the drawings, like reference numerals designate like or corresponding parts.

DETAILED DESCRIPTION

Figure 1:
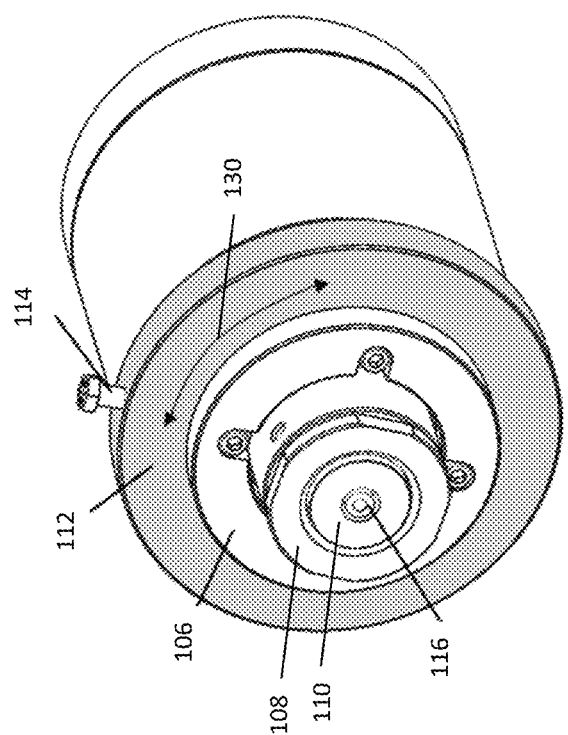
FIG. 1: An extrusion die assembly with a rotatable adjustment sleeve containing an adjustment bolt.

An extrusion die system is constructed of an assembly of axially aligned modules which are constructed having a balanced flow passage extending through the assembly to supply a flow, such as plastic, to a conical extrusion channel. The passage ends in an extended gap exit channel (such as an annular or profile shaped gap) formed by alignment of surfaces from the die assembly and tip module.

The die assembly as used herein refers to the entire die apparatus and in its simplest aspect might just be a die and a body but more generally consists of a die body 100, a die holder 102, retainer bolt 104, die holder retainer 106, one or more die nuts 108 and a die 110 which are all aligned and constructed around an axial bore formed by the cooperation of the modules. A tip module is positioned in the axial bore. The tip module consists of upstream and downstream parts mounted in a tip holder. The center line axis (formal or express) is known as the central axial tip. The die and the tip module cooperate to form an extended exit channel or gap which communicates with the extrusion channel. The die is mounted on the die holder and the tip portions are mounted within the axial bore by the tip holder. The tip module can also include any substrate such as a wire, rod or another extruded product which travels through the die subassembly and would be analogous to a stationary tip in the formation of a gap.

The term die subassembly generally refers to the apparatus participating and shaping the extrusion flow and may be just a die but more often includes a die, die holder and one or more die nut(s). These components taken as a whole are displaced as a unit as force is applied by the adjustment means such as a bolt.

Figure 2:
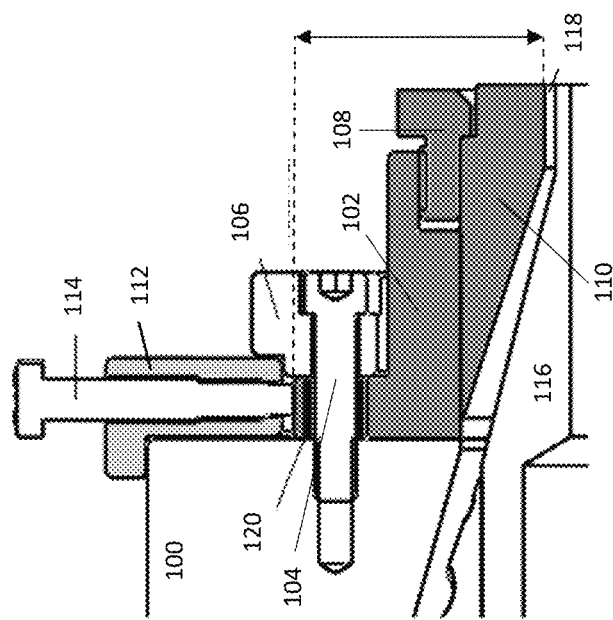
FIG. 2: A portion of a cross section of an extrusion die showing various die components. The die subassembly components in dark grey would move relative to the tip by turning the adjustment bolt resulting in a change in the gap size. The adjustment sleeve is shown in light grey.

The present invention also involves a rotatable adjustment sleeve which can be actuated along with an adjustment bolt or similar adjustment device means to adjust the concentricity of the die and/or die components relative to the tip. The adjustment sleeve and any adjustment device would form an adjustment sleeve subassembly. Any die components which would be adjusted/displaced by the adjustment device(s) would form a die subassembly. Other extrusion die assembly components such as a body, deflector, retainer and tip with which the die subassembly would be adjusted relative to would form a die body subassembly. FIG. 1 shows an example extrusion die assembly with a rotatable adjustment sleeve 112 along with an adjustment bolt 114 which could be used to adjust concentricity between the tip 116 and the die 110. The adjustment sleeve 112 along with the bolt 114 can be rotated 130 relative to the other components to allow for single point adjustment 122. Depending on the current concentricity of the tip 116 relative to the die 110, the bolt 114 may need to be slightly loosened to allow for this rotation. The adjustment sleeve 112 would have a shoulder which would allow it to maintain its concentricity to the body or the rest of the die assembly but would have enough clearance 120 to allow for rotation. Tightening of the bolt 114 in the adjustment sleeve 112 will result in movement of the/die subassembly (also known as a die cartridge) components relative to components in the body subassembly such as but not limited to the tip 116, body 100 and die holder retainer 106. FIG. 2 depicts a portion of a cross section of an extrusion die assembly showing various die components. The adjustment sleeve 112 is shown in light grey. Die subassembly components can include but are not limited to a die 110, die holder 102, die heaters and a die nut 108 which are shown in dark grey. The die subassembly components in dark grey would move relative to the tip 116 by turning the adjustment bolt resulting in a change in the gap 118 size. In FIG. 1 the bolt would apply pressure onto the die holder 102 resulting in the die 110 moving closer to the tip 116 at this point and reducing the size of the gap 118. In this figure the retainer bolt 104 is connecting the die holder retainer 106 to the body 100 of the extrusion die. These retainer bolts 104 may be tightened substantially enough to prevent material from leaking out but not too tight that it would prevent the die holder 102 sliding relative to the die body 100 and die holder retainer 106 while being adjusted. The die holder 102 would have substantial clearance 120 for the bolts to pass through to allow this adjustment to happen.

Figure 3:
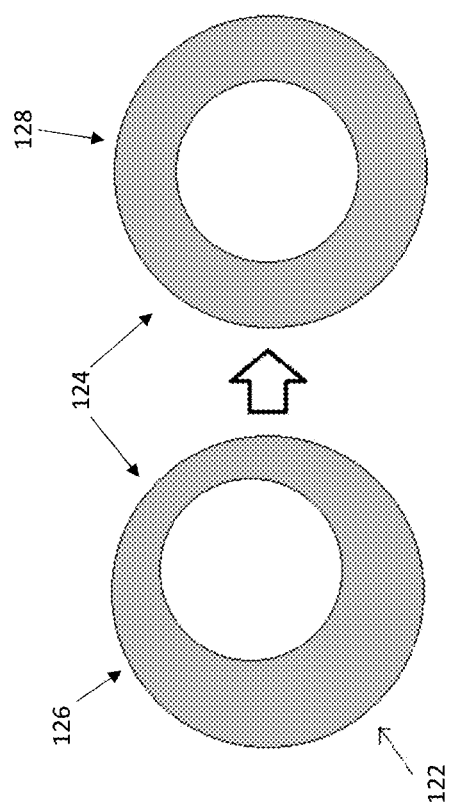
FIG. 3: An example schematic of where a non-concentric product could be adjusted to create a concentric product.

Another variation of this invention would include multiple adjustment bolts in the adjustment sleeve. Other mechanism means besides bolts such as latches or levers could also be used to push or pull the die subassembly components. The adjustment sleeve can also be made to rotate via a motor and the adjustment mechanism such as a bolt could also be adjusted via a motor. Product made by the extrusion die can be sampled and tested for desired concentricity and the results could be used to automatically perform adjustments. The product can be tested manually or via a machine and either intermittently or continuously. The feedback mechanism could also use software to implement a statistical analysis or machine learning technique in order to better correlate predicted results with actual change in concentricity. FIG. 3 shows the angle and location of where the adjustment sleeve 112 could be rotated and tightened in order to adjust an extrusion die 124 from making an example non concentric product 126 into making a concentric one 128. As depicted in FIG. 3, the adjusted tubular extrusion product has a central cavity with walls of equal diameter.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit or scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for adjusting the position and concentricity of a die subassembly relative to a central axial tip, the device comprising:
   a die body assembly including the central axial tip;
   a die subassembly positioned adjacent and in contact with the die body assembly, the die subassembly comprising:
      a retaining device to connect the die subassembly to the die body assembly;
      an adjustment sleeve subassembly including an adjustment sleeve circumferentially positioned adjacent the die subassembly and rotationally movable relative thereto; and
      an adjustment device connected to the adjustment sleeve at a fixed position thereon, the adjustment device being radially movable relative to the die subassembly and in contact with the die subassembly,
   wherein the adjustment device is capable of any degree of rotation relative to the die subassembly by rotating the adjustment sleeve relative to the die body and the die subassembly to thereby adjust the concentricity of the die subassembly relative to the die body assembly and the central axial tip thereof while maintaining the retaining device tightened sufficiently to prevent leakage between the die subassembly and the die body assembly.

2. A device according to claim 1, wherein said die subassembly further includes a die.

3. A device according to claim 2, wherein said die subassembly further includes a die holder and one or more die nuts circumferentially joined to the die holder and an axial bore that is formed between the central axial tip of the die body assembly and the die of the die subassembly.

4. A device according to claim 3, further including a tip module which is a solid module positioned in the axial bore forming a gap with the die subassembly and includes the central axial tip.

5. A device according to claim 1, wherein said adjustment sleeve subassembly comprises a concentrical shouldered sleeve with more than one adjustment device that is placed over the die subassembly.

6. A device according to claim 1, wherein said adjustment sleeve subassembly maintains concentricity of the die subassembly, and said adjustment sleeve subassembly is capable of rotating around the die subassembly when the adjustment device is loosened.

7. A device according to claim 4, wherein the gap is an annular exit channel.

8. A device according to claim 4, wherein the gap is a profile exit channel.

9. A device according to claim 1, wherein said adjustment device is a bolt.

10. A device according to claim 1, further including a first motor wherein the adjustment sleeve subassembly is rotated by the first motor.

11. A device according to claim 10, further including a second motor wherein the adjustment device is actuated by the second motor.

12. A device according to claim 11, wherein the first and second motors are controlled by feedback of results of testing the concentricity of an extruded product.

\* \* \* \* \*